March 24, 1925. 1,531,085
W. ELLWOOD
FRAMING MECHANISM FOR MOTION PICTURE MACHINES
Original Filed June 5, 1920 2 Sheets-Sheet 1
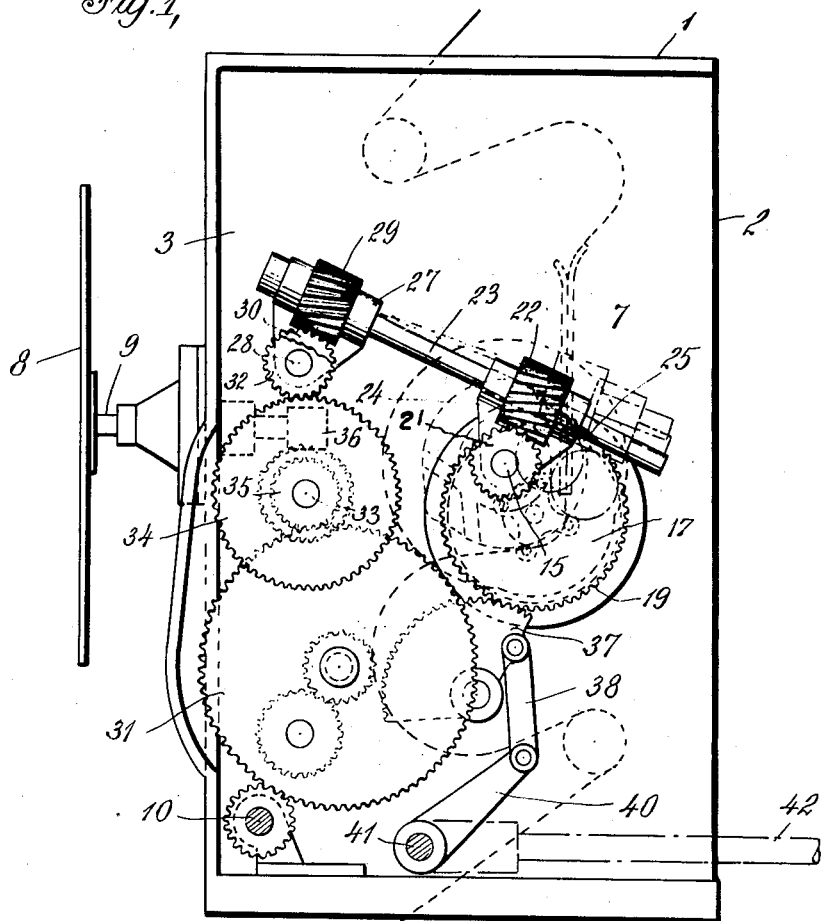
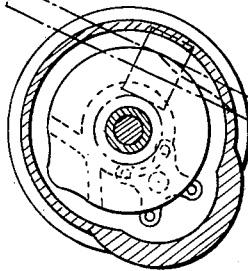
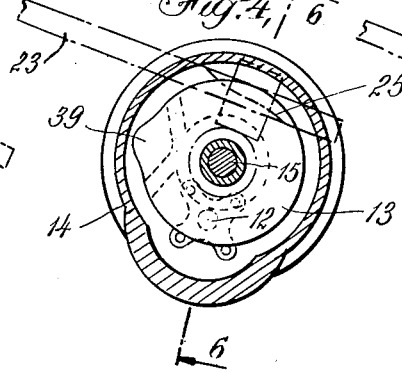
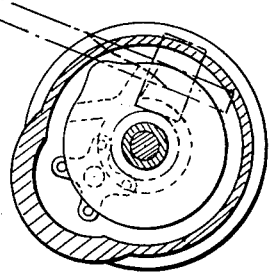
Inventor
William Ellwood
By his Attorneys
Pennie, Davis, Marvin & Edmonds March 24, 1925.
W. ELLWOOD
1,531,085
FRAMING MECHANISM FOR MOTION PICTURE MACHINES
Original Filed June 5, 1920    2 Sheets-Sheet 2
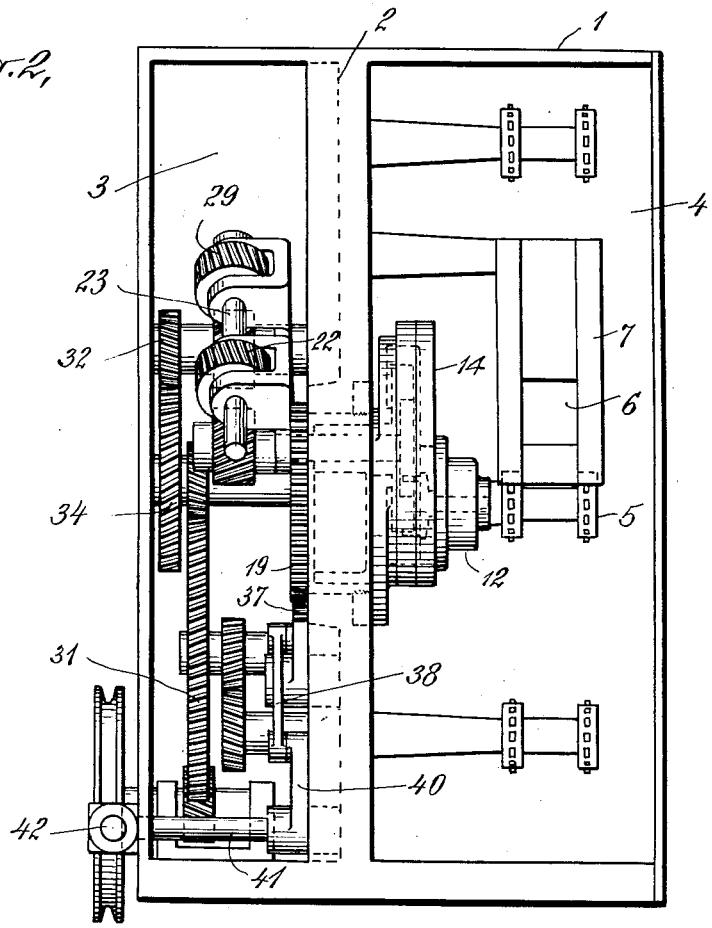
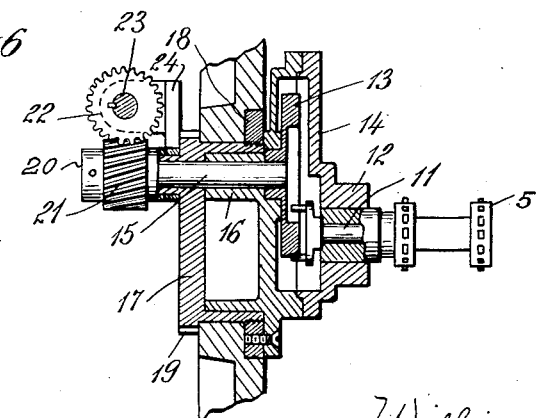
Inventor
William Ellwood
By his Attorneys
Pennie, Davis, Marvin & Edmonds Patented Mar. 24, 1925.

1,531,085

UNITED STATES PATENT OFFICE.

WILLIAM ELLWOOD, OF NEW YORK, N. Y., ASSIGNOR TO NICHOLAS POWER COMPANY, INC., OF NEW YORK, N. Y., A CORPORATION OF DELAWARE.

FRAMING MECHANISM FOR MOTION-PICTURE MACHINES.

Application filed June 5, 1920, Serial No. 386,869. Renewed July 19, 1924.

*To all whom it may concern:*

Be it known that I, WILLIAM ELLWOOD, a citizen of the United States, residing at New York city, in the county of New York, State of New York, have invented certain new and useful Improvements in Framing Mechanisms for Motion-Picture Machines; and I do hereby declare the following to be a full, clear, and exact description of the invention, such as will enable others skilled in the art to which it appertains to make and use the same.

This invention relates to framing mechanisms for motion picture machines, and has for its object to provide a framing mechanism in which the framing of the picture is effected by giving to the feeding sprocket an extra movement, either forward or backward, of sufficient extent to correct the displacement of the picture at the aperture.

The principal object of the invention is to provide a framing mechanism of this character in which the extra movement given to the sprocket does not alter the timed relation between the intermittent movement and the shutter. In framing mechanisms of this kind heretofore constructed, the intermittent gear for the sprocket has been driven through a planetary or epicyclic gear to permit the rotation of the driving member of the intermittent couple around the axis of the sprocket to thereby effect the partial rotation necessary to frame the picture. In such machine, in addition to the slight rotation given the sprocket, a partial rotation is also given to the driving member of the intermittent couple about its own axis, thereby destroying the relation between the sprocket and the shutter. To correct this it has heretofore been necessary to use a shutter adjusting mechanism operating in synchronism with the framing to give a corrective adjustment to the shutter, thereby adding to the complication and cost of the machine.

The object of the invention of the present application is to provide a novel form of gearing interposed between the intermittent driving couple and its fixed driving shaft whereby the driving member of the couple may be rotated around the axis of the driven member without destroying the geared driving connection and without effecting a rotation of the driving member of the couple about its own axis, thereby permitting the shutter to be directly driven from its driving gear without interposed correcting mechanism.

A further advantage of my improving framing mechanism is that it permits the intermittent couple to be enclosed in an oiltight casing which may be readily withdrawn bodily from the machine without disconnecting any of the inter-geared members, whereby a new intermittent gear and sprocket may be readily substituted without destroying the setting of the gears or requiring readjustment of the machine.

The improved mechanism of this application is also of simple construction, involving few moving parts and those of simple design not requiring great accuracy of construction or adjustment.

In the accompanying drawings I have illustrated my improved framing mechanism as applied to a moving picture machine of typical design, only so much of the machine as is necessary to an understanding of the mechanism being illustrated.

In said drawings,

Figure 1 is a side elevation of the machine showing the driving connection between the intermittent gear and its stationarily mounted driving shaft;

Fig. 2 is an end elevation looking from the right of Fig 1;

Figs. 3, 4, and 5 are diagrammatic views showing the parts of the intermittent gear and its driving connections in different position of adjustment; and Fig. 6 is a sectional view on line 6—6 of Fig. 4.

Referring to the drawings, particularly Figs. 1 and 2, 1 indicates the frame of the machine which includes a vertical longitudinal partition 2 dividing the frame into a gear compartment 3 and a film compartment 4 which contains the usual upper and lower continuously driven feed sprockets and the intermediate intermittently driven sprocket 5 by means of which the film is fed step by step across the projection aperture 6 in the plate 7. The light from the projection lantern is cut off from the aperture during the feeding movement of the film by the usual revolving shutter 8 supported on a shutter shaft 9 parallel with the optical axis of the machine and continuously driven from the power shaft 10 through a train of gearing which will be later described, the shutter being provided with the usual opaque wing of sufficient width to obscure the aperture during the movement of the film.

The intermittent mechanism comprises the sprocket 5 which is attached to a shaft 11 supported in a bearing 12 projecting from the face of the cap of an oil-tight gear casing 14 enclosing the intermittent couple. The particular intermittent gear selected for illustration is the well known cam movement shown and described in U. S. Letters Patent No. 1,129,121 granted to Nicholas Power on Feb. 23, 1915, although any other intermittent driving gear may obviously be employed instead. The driving shaft 15 of the cam 13 which constitutes the driving member of the intermittent gear is supported in an enlarged bearing 16 projecting eccentrically from the rear face of the housing 14 and telescoping in a bearing ring or cup 17 which is rotatably supported in the wall 2 of the frame for rotation about an axis in alinement with the shaft of the sprocket 5. The cup 17 is held in place in the frame by a locking ring 18 seated in a recess in the face of the partition 2, the arrangement being such that the housing 14 may be withdrawn from the cup 17 without disturbing the position of the latter in the frame.

The end of the shaft 15 projects beyond the base of the cup 17 and attached to its reduced end by a pin is a spiral pinion 21 having its teeth at an angle of 45 degrees to its axis of rotation.

The pinion 21 is driven from a pinion 22 of identical size and pitch carried by an adjustably supported shaft 23 lying in a plane parallel with the optical axis and at right angles to the shaft 15. The end of the shaft adjacent the pinion 21 is supported in a yoke 24 mounted for rotative adjustment on the bearing extension 20. The shaft 23 is supported in spaced bearings on the yoke with the pinion 22 lying between the bearings and keyed to the shaft by a spiral keyway 25, whereby the pinion will be held in mesh with the pinion 21 and adjusted angularly of the shaft, but the latter may slide back and forth in the pinion, effecting a slight rotation of the latter for a purpose to be later described.

The other end of the shaft 23 is supported in a yoke 27 mounted for rotative adjustment around the axis of a shaft 28 supported in fixed bearings in the partition 2 of the machine and serving as the driving shaft for the intermittent gear. The driving connection between the shaft 23 and the shaft 28 preferably consists of spiral pinions 29 and 30 of the same size and pitch as the pinions 21 and 22.

The shaft 28 may be driven from the driving shaft 10 through any suitable train of gears, here shown as comprising a gear 31 meshing with the pinion on the driving shaft and driving a pinion on a stub shaft 33 supported in the frame below the shaft 28. The shaft 33 carries a spiral pinion 34 meshing with a pinion 32 of the shaft 28. The shaft 33 also preferably carries a pinion 35 meshing with a pinion 36 on the end of the shutter shaft 9, whereby the shutter shaft and the shaft 11 will be driven in synchronism.

Any suitable mechanism may be provided for rotatably adjusting cup 17 in its bearing to produce the partial rotation of the sprocket for framing the picture. I have shown for the purpose a rocking sector 37 having its teeth meshing with teeth 19 cut in the flange surrounding the base of the cup 17. Attached to the sector 37 is a link 38 which is connected to a crank arm 40 supported on a crank shaft 41 mounted on the base of the machine and projecting through the side wall of the casing to the rear of the driving shaft 10. The projecting end of the shaft 41 has attached to it the usual framing handle 42 through which the adjustment may be conveniently effected.

In framing the picture the maximum movement necessary is the height of one picture at the aperture, which is equivalent to a rotative movement of the sprocket through a distance equal to three of the twelve teeth, the sprocket being designed to feed one picture at each quarter revolution. As will be obvious from Figs. 3, 4 and 5, a quarter revolution of the sprocket (that is, the maximum framing movement) will be accomplished by a rotation of the driving cam of the intermittent about the axis of the sprocket through an arc of 90 degrees. The full framing movement is represented by the full line and most distant broken line positions of the driving pinion 22 and its associated parts in Fig. 1, the middle intermediate position of maximum angular adjustment being also indicated in broken lines. In such movement the shaft 23 will be tilted slightly about the axis of the shaft 28 while the gear 22 will be slid along its spiral keyway and the yoke 24 will be turned slightly to accommodate the changing angle of the shaft 23 with relation to the shaft 28.

It will be noted from Figs. 3, 4 and 5, that the cam 13 does not rotate on its own axis during the framing movement, that is, the driving projection 39 of the cam remains the same distance in advance of the pin wheel, assuming the machine not to be running. The pinion 21 will also remain stationary and the periphery of the pinion 21 will therefore turn on the periphery of the pinion 22. For instance, the tooth on the gear lying in the line connecting the centers of the shafts 12 and 15 will remain in that position, which point, as may be seen in Figs. 3, 4 and 5, moves from a point at one side of the pinion 22, in Fig. 3, to a point directly opposite (Fig. 4) and then to a point on the other side of the pinion (Fig. 5), in all, a movement of about 90 degrees.

If the pinion 22 were attached to the shaft 23 by a straight key so as to have no rotative movement independent of the shaft, this relative movement of the faces of the two pinions would obviously cause a rotative movement of either the shaft 23, thereby throwing the shutter out of synchronism, or of the cam 13 with the same result. The spiral key may, however, be cut so as to exactly compensate for this movement, allowing both the shaft 23 and the cam to remain stationary. If the pinions are the same size and their teeth of the same pitch, the spiral keyway would have to make about a quarter turn of the shaft in the distance from one extreme framing position to the other.

The only other movement of the driving connection which tends to produce a rotative movement of the pinion 21 on its own axis is the angular movement of the shaft 23. This angular movement is so slight, as will be apparent from Fig. 1, that the rotative movement produced by it is negligible in any event, and may be taken care of by adding very slightly to the width of the shutter blade which covers the aperture during the movement of the film. However, the machine may be so constructed as to completely compensate for this slight movement, and is so shown in the drawings.

Referring to Fig. 1, the angular movement of the shaft 23 in its adjustment from the full line position to the intermediate dot-and-dash line position will be toward the left, or in a counterclockwise direction around the shaft 28. This relative movement of the gears produces a slight rotation of the shaft 23 which, when transmitted through the shaft 23 and gears 22, 21 to the shaft 15, tends to turn that shaft toward the right, or in a clockwise direction. As the pinions 29 and 22 are maintained in parallelism with the shaft 23, the pinions 21 and 22 will have the same relative angular movement as the gears 28, 29, which movement will tend to turn the pinion 21 in a counterclockwise direction, that is, in the opposite direction to the movement imparted to it by the relative rotation of the gears 28, 29. If all the pinions are the same size and of the same pitch, that is, 45 degrees, the rotative movement effected by the adjustment of one pinion around the axis of its fellow will necessarily be equal to the movement effected by the relative rotative adjustment of the other two pinions and in the opposite direction, so that the shaft 15 will not be turned at all by the framing adjustment and synchronous operation of the shutter and the intermittent gear will be maintained exact at all times.

It will of course be understood that various changes in the construction above described may be made without departing from the spirit or scope of the invention, the principal feature of the invention being the arrangement whereby with an intermediate driving connection of simple design and a minimum number of part, driving movement is imparted to the intermittent couple through an adjustable driven member in such manner that the latter may be adjusted to frame the picture without advancing or retarding the time of operation of the intermittent sprocket.

I claim:

1. In a framing mechanism for motion picture machines, the combination of an intermittent sprocket, an intermittent couple for operating the sprocket, means for adjusting the driving member thereof to frame the picture, and means for driving the said driving member comprising a continuously rotated shaft, gears connecting said shaft with said driving member, one of said gears being slidable on the shaft to maintain the gears in mesh during the framing adjustment, and means operating synchronously with said framing adjustment to rotate said gears to compensate for the rotative movement of said driving member effected by its framing adjustment.

2. In a framing mechanism for motion picture machines, the combination of an intermittent sprocket, an intermittent couple for operating the sprocket, means for adjusting the driving member thereof to frame the picture and means for driving said driving member comprising a continuously rotated shaft, gears connecting said shaft and said driving member, and means for effecting a relative rotative movement of said shaft and a gear carried thereby during the framing adjustment to compensate for the rotative movement of the driving member effected by its adjustment.

3. In a framing mechanism for motion picture machines, the combination of an intermittent sprocket, an intermittent couple for driving the sprocket, means for adjusting the driving member of said intermittent couple around the axis of said sprocket to thereby effect a partial rotation of the sprocket for framing the picture, and means for driving said driving member comprising a continuously rotated shaft having a fixed axis of rotation, a second shaft driven therefrom mounted for oscillation about the axis of said continuously rotated shaft, gearing connecting said second shaft and said driving member, and means for effecting a relative rotation of said gearing and said second shaft during the framing movement to compensate for the rotative movement of said driving member produced by said adjustment.

4. In a framing mechanism for motion picture machines, the combination of an intermittent sprocket, a driving mechansm therefor comprising a bodily adjustable member for effecting the framing movement and means for driving said member comprising a shaft lying in a plane at right angles to the axis of the sprocket, gearing connecting said shaft and said adjustable member, one of said gears being slidable on said shaft and having a spiral key connection with said shaft to effect a partial rotation of the gear during the framing movement.

5. In a framing mechanism for motion picture machines, the combination of an intermittent sprocket, a driving mechanism therefor comprising a member bodily adjustable to effect the framing movement, and means for driving said member comprising a driving shaft having a fixed axis of rotation, an intermediate shaft lying in a plane at right angles to the axis of the sprocket, said shaft being mounted for oscillation in the plane of its axis about the axis of said first mentioned shaft, gearing connecting said shafts, gearing connecting said adjustable shaft and said adjustable member, one of said gears being slidable on its shaft to maintain said gearing in driving engagement in all positions of framing adjustment.

6. In a framing mechanism for motion picture machines, the combination of an intermittent sprocket, a driving mechanism therefor comprising a member bodily adjustable to effect the framing movement, means for driving said member comprising a driving shaft having a fixed axis of rotation, an intermediate shaft lying in a plane at right angles to the axis of the sprocket, said shaft being mounted for oscillation in the plane of its axis about the axis of said first mentioned shaft, gearing connecting said shafts, gearing connecting said adjustable shaft and said adjustable member, one of said gears being slidable on its shaft to maintain said gearing in driving engagement in all positions of framing adjustment, and a spiral key connection between said sliding gear and its shaft to produce a partial rotation of said gear during the framing movement.

In testimony whereof I affix my signature.

WILLIAM ELLWOOD.